July 26, 1932.  B. F. GREIMANN  1,868,745

HEATING SYSTEM FOR BUILDINGS

Filed Dec. 2, 1929

Inventor
Benjamin F. Greimann
by Bair, Freeman & Sinclair
Attorneys

Witness
Carl Bloomburg

Patented July 26, 1932

1,868,745

UNITED STATES PATENT OFFICE

BENJAMIN F. GREIMANN, OF GARNER, IOWA

HEATING SYSTEM FOR BUILDINGS

Application filed December 2, 1929. Serial No. 411,133.

The object of my invention is to provide a heating system for buildings, of simple, durable and comparatively inexpensive construction.

More particularly, it is my object to provide a heating system consisting of heat conductors beneath the floor of a building and a supply conductor for conducting heat to the heat conductors, the heat being generated in a furnace or the like from which both the smoke and heat is discharged into the supply conductor, from the supply conductor into the heat conductors and from the heat conductors is discharged through a chimney to atmosphere.

A further object is to provide novel means of controlling the distribution of the heat from the supply conductor so that it is evenly distributed beneath the entire floor of the building.

My heating system is designated for hog houses, poultry houses and the like and keeps the floor thereof warm, as well as the space within the building above the floor. The heat coming up through the floor also keeps the floor dry and in the summer time, the device may be opened for allowing air to circulate through it, the circulation being caused by the draft in the chimney so as to keep the floor and the ground beneath the floor dry at all times.

A further object is to provide in combination with a supply conductor, a plurality of heat conductors with a manifold for connecting them together, a controlling means being provided in the manifold for controlling the flow of heat therethrough and for distributing it evenly from the supply conductor to a comparatively wider heat conductor arrangement.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1:
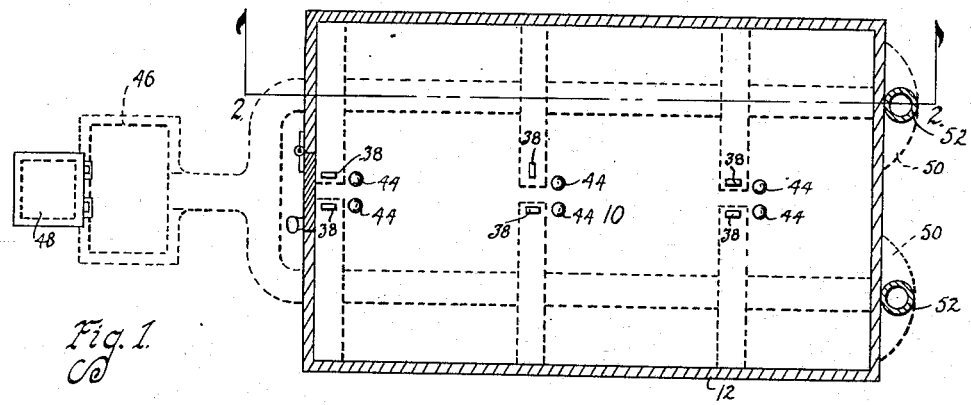
Figure 1 is a horizontal sectional view through a building with my heating system installed in connection therewith.
Figure 2:
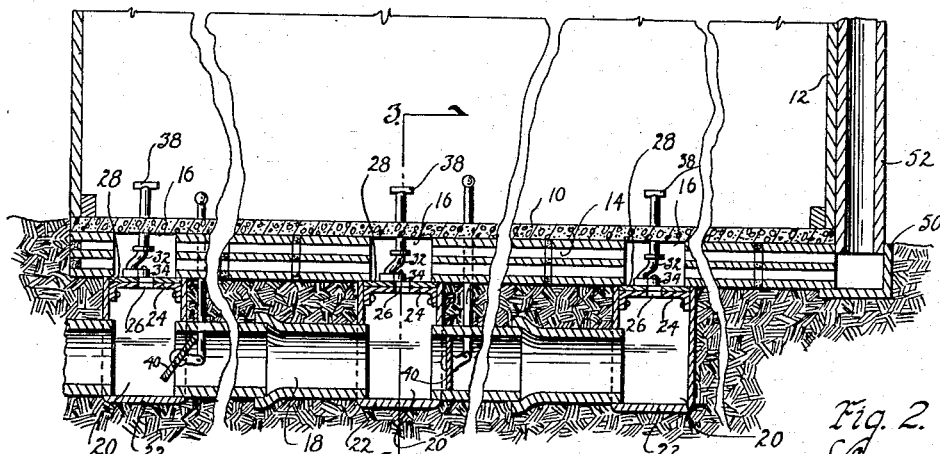
Figure 2 is an enlarged sectional view on the line 2—2 of Figure 1.
Figure 4:
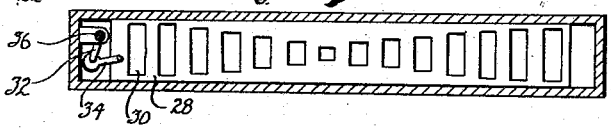
Figure 4 is a sectional view on the line 4—4 of Figure 3.

On the accompanying drawing, I have used the reference numeral 10 to indicate the floor of a building 12. The floor 10 is preferably formed of concrete. The floor 10 is laid on a plurality of heat conductors 14, which may be formed of ordinary building tile. At predetermined intervals the heat conductors 14 have open spaces 16.

Below the heat conductors 14, I provide a supply conductor 18 which may be formed of ordinary drain tile and the supply conductor at intervals has open spaces 20 similar to the open spaces 16 of the heat conductors 14. A means of communication is provided between the open spaces 20 and the open spaces 16 and consists of manifolds or connecting chambers 22. The manifolds 22 spread from the supply conductor 18 to the plurality of heat conductors 14, as clearly shown in Figure 3.

Within each manifold 22, I provide a shutter control mechanism consisting of a stationary plate 24 having openings 26 and a slidable plate 28 having openings 30.

The shutter plate 28 may be slid in opposite directions by means of a crank 32 connected therewith by a link 34. The crank 32 is formed on a control rod 36 having a handle 38. It will be noted that the openings of the plates 24 and 28 are smaller at the center than at the ends as the heat comes up through them at the center and has to go farther to get to the ends and by such arrangement of openings, the heat is evenly distributed throughout the width of the manifold.

Figure 3:
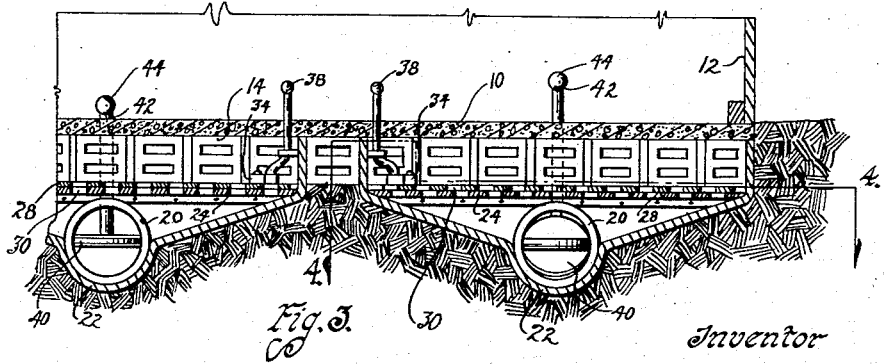
Figure 3 is a sectional view on the line 3—3 of Figure 2.

In the supply conductor 18, between the manifolds 22, I provide dampers 40, which may be opened and closed by means of control rods 42 having knobs 44. In Figures 1 and 3, I have illustrated two of the supply conductors 18, but as many as desired for the width of the building may be used. The supply conductors 18 are connected with an under-ground furnace 46 to which access may be had through the door 48.

At the discharge ends of the heat conductors 14, I provide manifolds 50 for conducting the products of combustion of the furnace 46 to chimneys 52.

From the foregoing description, it will be obvious that I have provided means for conducting both the heat and smoke from the furnace 46 beneath the entire floor 10 and discharge it to atmosphere through the chimneys 52, which produces a draft for causing the conduction of the heat beneath the floor 10.

The dampers 40 and the shutter plates 28 may be regulated for evenly distributing the heat beneath the entire floor or for causing parts of the floor to be warmer than others if desired.

The control members 38 and 44 may be located down the center of the building as shown in Figure 1 and pig pens may be constructed in the building, leaving a central alleyway for an attendant to manipulate the controls. Thus, the controls are not obstructions in the pig pens.

My heating system can be applied to corn cribs and granaries as well as hog houses and the like so that a dry floor for the grain is provided.

In my claims, I refer to shutters and dampers, but I wish it to be understood that I am not limited to the particular types shown, because other controlling devices can be used to accomplish the same result and yet stay within the scope of my claims. Other changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a heating system for buildings, an underfloor of hollow construction arranged to serve as a hot gas conductor throughout the length of the building, an upper floor superimposed on said underfloor and heated by hot gases flowing through the underfloor, said underfloor being broken to provide open spaces at intervals, said upper floor spanning such open spaces, a hot gas delivery pipe, manifolds communicating therewith and with said open spaces and a hot gas discharge flue communicating with one end of said underfloor.

2. In a heating system for buildings, an underfloor of hollow tiles arranged to serve as hot gas conductors throughout the length of the building, an upper floor superimposed on said underfloor and heated by hot gases flowing through the underfloor, said underfloor being broken to provide open spaces at intervals, said upper floor spanning such open spaces, a hot gas delivery pipe in communication with said open spaces, a damper in said hot gas delivery pipe between said open spaces and a hot gas discharge flue communicating with one end of said underfloor.

3. In a heating system for buildings, an underfloor of hollow construction arranged to serve as a hot gas conductor throughout the length of the building, an upper floor superimposed on said underfloor and heated by hot gases flowing through the underfloor, said underfloor being broken to provide open spaces at intervals, said upper floor spanning such open spaces, a hot gas delivery pipe, manifolds communicating therewith and with said open spaces, dampers in said manifolds between said hot gas delivery pipe and said underfloor and a hot gas discharge flue communicating with one end of said underfloor.

4. In a heating system for buildings, an underfloor of hollow construction arranged to serve as a hot gas conductor throughout the length of the building, an upper floor superimposed on said underfloor and heated by hot gases flowing through the underfloor, said underfloor being broken to provide open spaces at intervals, said upper floor spanning such open spaces, a hot gas delivery pipe, manifolds communicating therewith and with said open spaces, a damper in said hot gas delivery pipe between said open spaces, a damper in said manifolds between the hot gas delivery pipe and the underfloor and a hot gas discharge flue communicating with one end of said underfloor.

Des Moines, Iowa, August 8, 1929.
BENJAMIN F. GREIMANN.